A. J. FOWLER.
COTTON BLOCKER.
APPLICATION FILED JUNE 17, 1920.
1,368,621.
Patented Feb. 15, 1921.
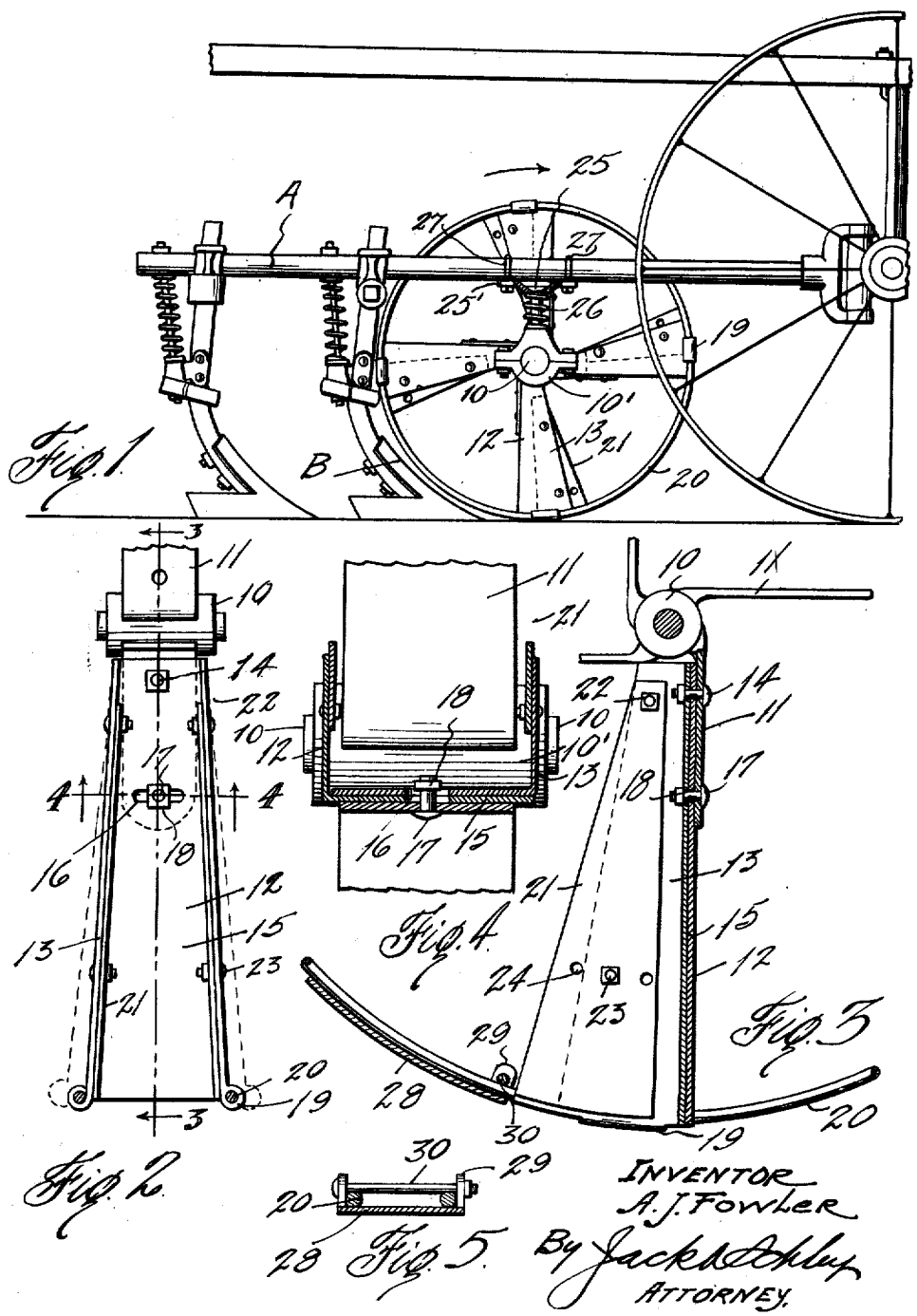
INVENTOR
A. J. Fowler
By Jack A. Ashley
ATTORNEY.

UNITED STATES PATENT OFFICE.

ALONZO J. FOWLER, OF HILLSBORO, TEXAS.

COTTON-BLOCKER.

1,368,621. Specification of Letters Patent. Patented Feb. 15, 1921.

Application filed June 17, 1920. Serial No. 389,664.

*To all whom it may concern:*

Be it known that I, ALONZO J. FOWLER, a citizen of the United States, residing at Hillsboro, in the county of Hill and State of Texas, have invented certain new and useful Improvements in Cotton-Blockers, of which the following is a specification.

This invention relates to new and useful improvements in cotton blockers.

It is a common practice to chop young cotton plants so that where the plants are too numerous and too close together, they are removed to promote the growth and propagation of the plant.

It has been established that covering up the cotton with dirt will have the same effect as chopping it out and my invention has to do with the covering of the cotton plants so as to leave only those exposed which it is desired to cultivate.

The invention has to do with the provision of means adapted to be attached to a cultivator and arranged to protect the plants at spaced intervals from being covered up by the soil which is thrown up by the cultivator shovels. The invention also includes means for mashing down the plants except where a stand is desired; this form of the invention to be used when the plants have grown too large to cover.

In carrying out the invention I mount a revolving member between the cultivator beams in front of the front shovels. The device includes radial fenders having their front sides open, but closed on three sides. When the fenders reach a perpendicular position below the axis of the device they protect the plants from the soil which is thrown by the cultivator shovels thus leaving a stand. The juxtaposition of these fenders with relation to the periphery of the revolving device will control the space left between the coton plants which are preserved for cultivation. Rim plates are provided for attachment to the rim of the device between the fenders when it is desired to mash down the cotton plants instead of covering them by means of soil. The device is resiliently mounted so as to yield upwardly to any obstruction. It is proposed to make the fenders adjustable transversely and circumferentially of the device.

The invention will be more readily understood from a reading of the following specification and by reference to the accompanying drawings, in which an example of the invention is shown, and wherein;

Figure 1 is a side elevation of a portion of a cultivator equipped with a device constructed in accordance with my invention, Fig. 2 is a radial sectional view of the device, Fig. 3 is a vertical sectional view taken on the line 3—3 of Fig. 2, Fig. 4 is a cross-sectional detail taken on the line 4—4 of Fig. 2, and Fig. 5 is a sectional detail of one of the removable rim sections.

In the drawing the numeral 10 designates a hub box, which is provided with tangentially extending arms 11. Radial fenders 12 extend from the hub 10 and exhibit a substantially U-shape in cross sections. These fenders are preferably made of sheet metal and bent at right angles so as to have forwardly directed sides 13. The fenders extend outwardly from the hub 10 and each is fastened to one of the arms 11 by a pivot bolt 14. The fender is made in two sections with overlapping flaps 15 at its rear. These flaps are pivoted on the bolt 14 and are provided with slots 16 concentric to the pivot bolts. Through the lower portion of each arm an adjusting bolt 17 is passed and this bolt passes through the slots 16 of the fender which is attached to said arm, bolts 17 are fastened by nuts 18. It will be seen that by loosening the nuts 18 the fenders may be extended or contracted transversely of the device as is indicated by dotted and full lines in Fig. 2.

At the outer end each side member 12 of the fenders has a sleeve 19 receiving a rim ring 20. When the fenders are adjusted transversely, the ring is likewise spread apart or drawn together. Adjustable wings 21 are pivoted to the sides 12 by means of bolts 22 and 23. Each wing has a plurality of holes 24 in position to be engaged by the bolts 23 whereby the wings may be adjusted circumferentially of the device and forwardly of the fenders, thereby increasing or decreasing the size of the fenders circumferentially of the device so that as the blocker is revolved either more or less of the cotton plants will be protected from the soil which is thrown up by the cultivator shovels.

Vertical bolts 25 extend upwardly from bearing boxes 10' receiving each end of the hub 10 and each bolt is surrounded by a coil spring 26. In using the blocker the bolts 25 are suspended from hangers 25' suitably fastened to the beams A of a cultivator by means of U-bolts 27 as is shown in Fig. 1, with the spring 26 under the hanger so that the hub 10 may yield upwardly as will be obvious. The blocker is set just in front of the front cultivator shovels B. It will be seen that as the cultivator is drawn forwardly the blocker will be revolved and the fenders will be swung to a position just in front of the shovels B, and will pass between the shovels thus protecting the plants which are straddled, from the soil thrown up by said shovels. I have found that four fenders are ample for good results and by adjusting the wings 21 a proper stand may be had. Sometimes the farmer is not able to get into his field until the cotton has grown too high to be covered by plowing and in such cases I provide removable rim plates or segments 28 which are mounted to fit on the rings 20 between the fenders. Each plate has inwardly directed ears 29 at each end and by passing bolts 30 transversely through the ears and across the inner side of the rings as is indicated in Figs. 3 and 5, the segments will be securely fastened on the blocker. This will give the blocker a flat surface except at the fenders, where openings will be provided for receiving the plants which it is desired to cultivate. The blocker is drawn along the row in the usual manner and a stand of cotton thus had. This device is not to be limited to use on cotton plants.

Various changes may be made in the construction within the scope of the appending claims.

What I claim, is:

1. In a blocking device of the character described, a hub member, fenders radiating from the hub, said fenders being transversely adjustable and adjustable also circumferentially of the blocker, and annular rim rings attached to the fenders at their outer ends.

2. In a blocker of the character described, a hub, fenders radiating from the hub, rim rings carried at the outer end of the fenders, and removable segments fastened to the rings on the periphery of the blocker.

3. In a blocker of the character described, a hub, fenders radiating from the hub, a rim attached to the fenders, and removable segments fastened on the rim between the fenders.

4. In a blocker of the character described, a hub, arms extending from the hub, fenders extending radially from the hub and mounted on the arms, said fenders being transversely adjustable, wings adjustably secured to the sides of the fenders, rim rings secured to the fenders at the outer ends thereof, and means for resiliently connecting the hub with an agricultural implement.

In testimony whereof I affix my signature.

ALONZO J. FOWLER.